(12) United States Patent
Schwanka Trevisan et al.

(10) Patent No.: US 11,545,832 B2
(45) Date of Patent: Jan. 3, 2023

(54) METHOD FOR CONTROLLING A WIND FARM IN ORDER TO DAMP SUB SYNCHRONOUS OSCILLATIONS

(71) Applicant: Wobben Properties GmbH, Aurich (DE)

(72) Inventors: Aramis Schwanka Trevisan, Aurich (DE); Angelo Mendonca, Wilhelmshaven (DE); Jair Cassoli, Aurich (DE); Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 200 days.

(21) Appl. No.: 17/258,123

(22) PCT Filed: Jul. 4, 2019

(86) PCT No.: PCT/EP2019/068023
§ 371 (c)(1),
(2) Date: Jan. 5, 2021

(87) PCT Pub. No.: WO2020/007995
PCT Pub. Date: Jan. 9, 2020

(65) Prior Publication Data
US 2021/0159704 A1    May 27, 2021

(30) Foreign Application Priority Data

Jul. 6, 2018    (DE) .................... 10 2018 116 443.2

(51) Int. Cl.
*H02J 3/24*    (2006.01)
*G05B 15/02*    (2006.01)
(Continued)

(52) U.S. Cl.
CPC ............... *H02J 3/24* (2013.01); *G05B 15/02* (2013.01); *H02J 3/18* (2013.01); *H02J 3/381* (2013.01);
(Continued)

(58) Field of Classification Search
CPC ...... H02J 3/24; H02J 3/18; H02J 3/381; H02J 13/00002; H02J 2300/28; H02J 3/48;
(Continued)

(56) References Cited

U.S. PATENT DOCUMENTS

| 4,607,217 A | * | 8/1986 | Bhargava | ............... | G01R 23/02 322/29 |
| 9,920,746 B2 | | 3/2018 | Diedrichs et al. | | |

(Continued)

FOREIGN PATENT DOCUMENTS

| CN | 105226679 A | 1/2016 |
| CN | 105515018 A | 4/2016 |

(Continued)

OTHER PUBLICATIONS

Abdou et al., "Damping of Subsynchronous Oscillations and Improve Transientstability for Wind farms", 2011, IEEE. A. F. Abdou (Year: 2011).*

(Continued)

*Primary Examiner* — Mohammad Ali
*Assistant Examiner* — Kelvin Booker
(74) *Attorney, Agent, or Firm* — Seed IP Law Group LLP (57) ABSTRACT

A method for controlling a wind farm to damp low-frequency electrical oscillations, in particular subsynchronous resonances, in an electrical supply grid having a grid voltage with a nominal grid frequency is provided. The wind farm comprises at least one wind turbine connected to the electrical supply grid. The method includes sensing at least one low-frequency electrical oscillation of the electrical supply (Continued)

grid; determining an oscillation characteristic of each of the at least one sensed oscillation, the oscillation characteristic describing at least one property of the sensed oscillation; specifying an active-power damping signal and/or a reactive-power damping signal for damping the at least one low-frequency oscillation; feeding in an active power component in accordance with the active-power damping signal or a reactive power component in accordance with the reactive-power damping signal, the active-power damping signal and the reactive-power damping signal being specified in dependence on the determined oscillation characteristic.

21 Claims, 5 Drawing Sheets (51) Int. Cl.
  *H02J 3/18* (2006.01)
  *H02J 3/48* (2006.01)
  *H02J 13/00* (2006.01)
  *H02J 3/38* (2006.01)
  *H02J 3/50* (2006.01)
(52) U.S. Cl.
  CPC ............. *H02J 3/48* (2013.01); *H02J 3/50* (2013.01); *H02J 13/00002* (2020.01); *H02J 2300/28* (2020.01)
(58) Field of Classification Search
  CPC . H02J 3/50; G05B 15/02; Y02E 10/72; Y02E 10/76; F03D 7/0284; F03D 7/048
  See application file for complete search history.

(56) References Cited

U.S. PATENT DOCUMENTS

| 10,174,742 | B2 | 1/2019 | Diedrichs |
| 10,794,364 | B2 | 10/2020 | Brombach |
| 2011/0043952 | A1 | 2/2011 | Haussel et al. |
| 2011/0211951 | A1* | 9/2011 | Kooijman ................. F03D 7/04 416/31 |
| 2013/0176751 | A1 | 7/2013 | Olea et al. |
| 2013/0204557 | A1 | 8/2013 | Trudnowski et al. |
| 2014/0148962 | A1* | 5/2014 | Venayagamoorthy .... H02J 3/00 700/286 |
| 2016/0111883 | A1 | 4/2016 | Beekmann et al. |
| 2016/0141991 | A1* | 5/2016 | Khalili Nia ............. H02J 3/241 322/19 |
| 2018/0017604 | A1* | 1/2018 | Daw ..................... G01R 23/167 |
| 2018/0128243 | A1* | 5/2018 | Deng .................... G05B 19/048 |

FOREIGN PATENT DOCUMENTS

| DE | 102012212366 A1 | 1/2014 |
| DE | 102013208410 A1 | 11/2014 |
| DE | 102016101468 A1 | 7/2017 |
| EP | 3322060 A1 | 5/2018 |
| WO | 2005088802 A1 | 9/2005 |
| WO | 2010060451 A1 | 6/2010 |
| WO | 2014012789 A1 | 1/2014 |

OTHER PUBLICATIONS

Adamczyk et al., "Control of Full-Scale Converter Based Wind Power Plants for Damping of Low Frequency System Oscillations", 2011, Paper accepted for presentation at the 2011 IEEE Trondheim PowerTech. (Year: 2011).*

Edrah et al., "Reactive power control of DFIG wind turbines for power oscillation damping under a wide range of operating conditions", Jan. 2016, IET Generation, Transmission & Distribution. (Year: 2016).*

Ngamroo, I., "Review of DFIG Wind Turbine Impacton Power System Dynamic Performances", Sep. 2016, IEEJ Transactions on Electrical and Electronic Engineering IEEJ Trans 2017; 12: 301-311. (Year: 2016).*

Zhao et al., "An Optimal Reactive Power Control Strategy for a DFIG-Based Wind Farm to Damp the Sub-Synchronous Oscillation ofa Power System", Feb. 2014, Energies 2014, 7, 3086-3103; doi:10.3390/en7053086. (Year: 2014).*

Miao et al., Control of DFIG-Based Wind Generation to Improve Interarea Oscillation Damping, Jun. 2009, IEEE Transactions on Energy Conversion, vol. 24, No. 2. (Year: 2009).*

Hui et al., "Damping control strategies of inter-area low-frequency oscillation for DFIG-based wind farms integrated into a power system", Sep. 2013, Electrical Power and Energy Systems 61 (2014) 279-287. (Year: 2013).*

Dominguez-Garcia, "Power oscillation damping supported by wind power: A review", Jul. 2011, Renewable and Sustainable Energy Reviews 16 (2012) 4994-5006 (Year: 2011).*

Fan et al., "On Active/Reactive Power Modulation of DFIG-Based Wind Generation for Interarea Oscillation Damping", Apr. 2010, IEEE Transactions on Energy Conversion, vol. 26, No. 2, Jun. 2011. (Year: 2010).*

He et al., "Subsynchronous oscillation detection using phasor measurements and synchrosqueezing transform", IEEE 2015, 5 pages.

Anderson et al., *Sub synchronous Resonance in Power Systems*, IEEE Press 1990, 290 pages.

* cited by examiner

METHOD FOR CONTROLLING A WIND FARM IN ORDER TO DAMP SUB SYNCHRONOUS OSCILLATIONS

BACKGROUND

Technical Field

The present invention relates to a method for controlling a wind farm for damping low-frequency oscillations in an electrical supply grid. In addition, the present invention relates to a wind farm with a plurality of wind power installations for damping low-frequency oscillations in an electrical supply grid.

Description of the Related Art

An electrical supply grid generally has a nominal line frequency of 50 Hz or 60 Hz. This nominal line frequency can also be referred to as a system frequency. The electrical supply grid can also be referred to as a supply grid or grid in a simplified and synonymous manner.

Low-frequency oscillations can occur in the supply grid which have frequencies below the nominal line frequency. These oscillations are often referred to as subsynchronous resonances (SSR) or subsynchronous frequencies. For this purpose, in 1990, the Institute of Electrical and Electronics Engineers (IEEE) published the following definition for subsynchronous resonance:

Subsynchronous resonance is an electrical system state in which an energy exchange between an electrical network and a generator set takes place at one or more natural frequencies of the combined system that are below the synchronous frequency of the system."

P. M. Anderson, B. L. Agrawal, J. E. Van Ness: "Subsynchronous Resonance in Power Systems," IEEE Press 1990.

One problem which can occur in a supply grid is that the low-frequency oscillations can excite or amplify mechanical oscillations of synchronous generators directly coupled with the electrical supply grid. This can result in damage to the generators. If they are disconnected from the electrical supply grid for protection, this can result in a weakening of the electrical supply grid.

Low-frequency pendulum oscillations in the range of a few hertz can also occur in the supply grid between grid sections, i.e., a low-frequency oscillation between a first grid section in Germany and a second grid section in France, for example. Pendulum oscillations of this type can also result in partial grid disconnections in the supply grid. In the worst case, it can result in a blackout.

Due to the fact that in many countries the number of large power stations is decreasing, while decentralized converter-based generators such as wind power installations or photovoltaic installations are substituted, decentralized converter-based generators of this type are also becoming increasingly important for supporting the electrical supply grid.

In this case, the structure of the electrical supply grid can also change. The electrical supply grid is also subject to constant changes as a result of switching on and off procedures, maintenance work on supply lines or as a result of weather conditions. This also means that network capacities and line inductances or line impedances may change constantly overall. As a result, the low-frequency oscillations may also change continuously, which makes their detection and damping difficult.

Since wind farms increasingly form a part of the electrical supply grid and significantly influence the network properties, they can therefore contribute to stabilizing the power systems or the supply grid and can be used as a means for damping undesired subsynchronous resonances. However, wind farms of this type must also be able to adapt to the changed network properties with respect to the low-frequency oscillations.

In the priority application for the present application, the German Patent and Trademark Office has researched the following prior art: DE 10 2013 208 410 A1, US 2013/0204557 A1, CN 105226679 A as well as the article "Subsynchronous Oscillation Detection using Phasor Measurements and Synchrosqueezing Transform" by Miao He et al.

BRIEF SUMMARY

At least enabling or improving a damping effect of a wind farm on low-frequency oscillations in the electrical supply grid is provided herein.

A method is proposed for controlling a wind farm for damping low-frequency oscillations, in particular subsynchronous resonances, in an electrical supply grid. The description herein is therefore based on a wind farm with a plurality of wind power installations which are electrically interconnected with a wind farm and form a part of the electrical supply grid. The wind farm described here can also be representative of an individual wind power installation or of two or more wind farms. Subsequent explanations of the wind farm correspondingly also relate to an individual wind power installation. In normal operation, the wind farm is herein electrically connected to the supply grid via a network connection point and feeds electrical power into the electrical supply grid.

In addition, the supply grid has a line voltage with a nominal line frequency. The nominal line frequency is usually 50 Hz or 60 Hz. In particular, the low-frequency oscillations which are to be damped have a lower frequency than the nominal line frequency, namely less than half the nominal line frequency, for example. The low-frequency oscillations are therefore less than 25 Hz or 30 Hz. In this case, examples of characteristic frequency ranges of low-frequency oscillations, which are also known as "Power System Oscillations," are frequency ranges of approximately 0.2-3 Hz or 5-15 Hz, to name only two of many examples.

In particular, the low-frequency oscillations can have values of 1 Hz and less. However, they can also reach up to five times the value of the nominal line frequency. Oscillations with a frequency of a maximum of five times the value of the nominal line frequency are here referred to as low-frequency oscillations, preferably with a frequency which corresponds to no more than the nominal line frequency. In particular, the low-frequency oscillation does not have a frequency which corresponds to a multiple of the nominal line frequency. It should be noted that examining and taking into account low-frequency oscillations particularly serves to examine or ensure system stability of the electrical supply grid. This is different from assessing the network quality or signal quality of the voltage signal in the electrical supply grid, in the case of which harmonic waves are particularly important.

A low-frequency electrical oscillation of the electrical supply grid is firstly detected. For this purpose, the line voltage can be measured and evaluated at a network connection point at which the wind power installation or the wind farm feeds into the electrical supply grid, for example.

The line voltage measured in this way can be filtered with a low-pass filter, for example, which only lets through frequencies below the line frequency. The measured line voltage or the filtered line voltage, to stay with the example, can also be referred to and regarded as an oscillation signal which contains information regarding the oscillation detected or to be detected.

The oscillation, and thus also the describing oscillation signal, has an oscillation frequency which can also be referred to as a characteristic frequency or as a frequency of the low-frequency oscillation. However, the oscillation is also characterized by other features and in this case has an oscillation characteristic. Included in features of this type is an amplitude of the oscillation, in particular whether and how this amplitude oscillates. Small variations of the frequency can also be a characterizing feature. A combination of such features is also possible. It is particularly important that the oscillations can be classified depending on this and/or depending on other characterizing features.

The oscillation characteristic of the detected oscillation comprises at least one of these features or other features. This also includes the classification of the oscillation.

Determining such an oscillation characteristic of the detected oscillation is now also proposed, wherein the oscillation characteristic therefore describes at least one property of the detected oscillation.

In this case, the oscillation characteristic can also comprise characteristic information of the low-frequency oscillation, wherein the information can be determined or recorded directly through measurements or can result indirectly from an analysis or evaluation carried out. Further properties of the detected oscillation can be an oscillation mode which classifies the oscillation, or a location at which the low-frequency oscillation has been detected. The oscillation mode or a different classification can be a result of an analysis carried out of the detected oscillation or of the detected oscillation signal.

In this case, the oscillation mode describes a mode or an oscillation category of detected low-frequency oscillations, wherein in particular a distinction is made between the oscillation modes intraplant oscillations, which refer to oscillations between a plurality of production units connected to the electrical supply grid in one supply grid section, control mode oscillations, which refer to oscillations caused by feedback control of production units, consumer units or transducer units connected to the electrical supply grid, interarea oscillations, which refer to oscillations between a plurality of supply grid sections, and local plant oscillations, which refer to oscillations between a production unit connected to the electrical supply grid with the supply grid.

Determining the oscillation characteristic preferably takes place from at least one measurement of a line voltage of the electrical supply grid. In particular, in order to detect the oscillation characteristic, a voltage measurement is proposed here, for example at the network connection point at which a wind power installation or a wind farm feeds into the electrical supply grid. A three-phase measurement is preferably carried out here if the electrical supply grid—which is usually to be assumed—is a three-phase electrical supply grid. The at least one measurement is thus evaluated in order to identify or characterize a low-frequency oscillation in the electrical supply grid. An identification device can be provided for this purpose which detects and subsequently evaluates the line voltage.

The results of the measurement and evaluations, or a part thereof, are subsequently combined or provided as an oscillation characteristic, in particular provided to one or a plurality of control units which control the wind power installations or the wind farms. The oscillation characteristic therefore comprises measurement values as well as results of at least one analysis or evaluation of one or a plurality of voltage measurements, in order to characterize a low-frequency oscillation or the low-frequency oscillation signal.

It is proposed as a further step that specifying an active power damping signal ($\Delta P$) or a reactive power damping signal ($\Delta Q$) takes place in each case for damping the low-frequency oscillations characterized by the oscillation characteristic.

Specifying the active power damping signal ($\Delta P$) or the reactive power damping signal ($\Delta Q$) thus takes place depending on the detected oscillation characteristic or depending on the detected low-frequency oscillation which is characterized via the oscillation characteristic. After the low-frequency oscillation has been detected, a corresponding damping signal is generated for the active or reactive power. This is then provided to a control system in the wind power installation or in the wind farm. In one particular embodiment, it is proposed that the active power damping signal ($\Delta P$) or the reactive power damping signal ($\Delta Q$) is provided to a FACTS control system, wherein the FACTS control system controls a converter of a wind power installation.

It is proposed as a further step that an active power component is fed in accordance with the active power damping signal or a reactive power component is fed in accordance with the reactive power damping signal. In this case, specifying the active power damping signal ($\Delta P$) or the reactive power damping signal ($\Delta Q$) takes place depending on the characteristic frequency of the determined oscillation characteristic. The method can take place for damping a detected oscillation or a plurality of detected oscillations. If a plurality of oscillations are to be damped, an oscillation characteristic is preferably determined for each oscillation individually and at least one damping signal specified. The damping signals can then be combined, at least the active power damping signals and the reactive power damping signals, in order to be fed as a common damping signal. However, it is also possible to specify an active power damping signal and a reactive power damping signal together in each case for a plurality of oscillation characteristics.

It is thus proposed that the wind power installation or the wind farm feeds an active power or a reactive power into the electrical supply grid in order to damp the detected low-frequency oscillations. In this case, the feed-in which takes place in a wind power installation with a converter is fed depending on the specified active power damping signal ($\Delta P$) and/or the reactive power damping signal ($\Delta Q$). These can also be understood as set points or set point signals for the wind farm or the wind power installation.

According to a further embodiment, it is proposed that feeding the active power and/or reactive power component into the electrical grid takes place in such a way that load flows in the supply grid are changed in order to shift the electrical supply grid into a different operating point or changed load flow state. The electrical supply grid has an operating point which is characterized by load flows. This is thus changed, in particular shifted, depending on the detected low-frequency oscillation, so that in particular a different, in particular more stable, operating point is reached which has a damping effect particularly on the low-frequency oscillations. The wind farm can thus be used as a means for damping low-frequency oscillations in an electrical supply grid.

If, for example, a changed reactive power feed-in is carried out in a meshed grid, a load flow can be changed in a first grid section to which the wind farm is connected. The changed load flow in the first grid termination can, in turn, result in a changed load flow also arising in a different second grid section which is coupled with the first grid section. The state of the load flows in the grid thus changes through the feed-in of the wind farm. This can thus be used in order to damp an occurring low-frequency oscillation.

It is preferably proposed that as an additional method step, a network characteristic is determined which characterizes a structure of the electrical supply grid. In this case, specifying the active power damping signal ($\Delta P$) or the reactive power damping signal ($\Delta Q$) additionally takes place depending on the determined network characteristic.

It has been particularly recognized that the structure of the electrical supply grid has a direct influence on the low-frequency oscillations and should therefore be taken into account for effective damping. In particular, it has been shown that damping with a wind power installation or a wind farm is generally possible, but the response to the changed feed-in of the low-frequency oscillation depends on the prevailing network topology at the network connection point. In this case, what is of particular relevance is the size and distance of existing synchronous machines directly coupled with the electrical supply grid, particularly because of their oscillating weights which directly influence the electrical supply grid, or a converter component in the grid which indicates how large the proportion of electrical power fed in by converter-controlled generators or feeders is relative to the total electrical power fed in. Also what is of relevance are the structure and extension of the electrical supply grid, impedances between the aforementioned directly coupled synchronous generators, particularly with regard to their oscillating weights, in the supply grid, as well as an impedance between the wind power installations and a network core area, such as a municipal area. In this case, it may occur that a grid section to which a large number of generators with converters is connected requires a different power feed-in for damping low-frequency oscillations than a grid section with a small number of converter-controlled generators or feeders. This can be taken into account by means of the network characteristic. For this purpose, similarly to the oscillation characteristic, an identification device for determining the network characteristic can be provided for the network characteristic, which identification device can provide the detected network characteristic to a control system of the wind farm. Additionally or alternatively, the network characteristic can also be determined in advance and implemented in the wind farm, in particular in the identification device of the low-frequency oscillations. It is also possible for a grid operator that operates the electrical supply grid or a part thereof to transmit information of this type.

According to a configuration, the network characteristic or at least one relevant property of the network characteristic can form a part of the oscillation characteristic or at least be taken into account in its determination. Whether neighboring production units are currently feeding or not or whether they are in a specific mode in which, for example, a system service is provided can be taken into account, for example. Particularly in the case of large neighboring production units, this can influence the network characteristic and thus itself be considered a system property.

It is preferably proposed that determining an oscillation characteristic includes determining an oscillation mode, wherein a distinction is made between the previously described oscillation modes or oscillation categories intraplant oscillations, control mode oscillations, interarea oscillations and local plant oscillations.

In particular, it is therefore proposed here that the respective oscillation mode of the detected low-frequency oscillation in the electrical grid is taken into account in order to carry out a feed-in which is adapted to this. In this case, the oscillation mode is established in particular by evaluating or analyzing the line voltage. It has been recognized that damping low-frequency oscillations can be influenced differently via the active or reactive power feed-in depending on the oscillation mode. The oscillation can be influenced in a targeted manner by way of this characteristic or classification of the oscillation mode. In particular, this is based here on the knowledge that a classification of this type also makes it possible to take into account the cause of the respective oscillation more effectively.

If a local plant oscillation is present, for example, it is usually also locally restricted and can be damped in a more targeted manner by, for example, feeding a reactive power damping signal nearby, in order to therefore change the voltage at a relevant grid section and therefore to influence a power flow there and therefore to damp the local plant oscillation.

However, to mention a further example, if an interarea oscillation is present, long range power oscillations can therefore be present, in the case of which powers or energy quantities oscillate back and forth between large network areas. Here, an active power damping signal could feed active power in a targeted manner where and when there is currently a power deficit as a result of the oscillation. In addition, the network topology could play a role and this would be, for example, to supplement the feed-in of a reactive power damping signal which can result in voltage changes in grid sections and can therefore influence the power flow between the grid sections.

It is preferably proposed that the active power damping signal ($\Delta P$) and the reactive power damping signal ($\Delta Q$) are specified independently of one another and the fed active power component or the fed reactive power component are fed in such a way that different low-frequency oscillation modes are damped independently of one another.

In this case, such an independent specification of the active power damping signal or the reactive power damping signal can take place in such a way that two separate set points ($\Delta P$, $\Delta Q$) in each case for the active or reactive power component to be fed are provided to a control system of the wind power installation.

It is preferably proposed that the active power damping signal is formed by an active power damping function which receives at least one first property of the oscillation characteristic as an input signal and outputs the active power damping signal as an output signal, and that the reactive power damping signal is formed by a reactive power damping function which receives at least one second property of the oscillation characteristic as an input signal and outputs the reactive power damping signal as an output signal. Different functions are therefore provided for the two damping signals for their determination, namely in each case particularly a separate function block, wherein each of the two function blocks receives or outputs different input and output variables.

For example, the first property of the oscillation characteristic can be an oscillation frequency or a change in the oscillation frequency, which is then input into the active power damping function and from which, taking into account further information if applicable, the active power damping function is formed, in particular is calculated by a microprocessor.

As a further example, the second property of the oscillation characteristic can be an oscillation amplitude or a change in the oscillation amplitude, which is then input into the reactive power damping function and from which, taking into account further information if applicable, the reactive power damping function is formed, in particular is calculated by a microprocessor.

Additionally or alternatively, it is proposed that the active power damping signal (ΔP) or the reactive power damping signal (ΔQ) is specified independently of an active power set point signal or reactive power set point signal ($P_{FCU}$, $Q_{FCU}$) of a wind farm controller. In particular, an additional control unit (controller) is provided for this purpose. This can be connected in parallel to a wind farm control unit and can be set up to specify set points for the active and reactive power component independently of a wind farm control system. In this case, the control unit can be implemented in the identification device. The advantage of this is particularly that the set points (ΔP, ΔQ) for the active or reactive power component to be fed are disconnected from the wind farm control system and there is no need for intervention in the wind farm control system.

In one particular embodiment, it is proposed that the active power damping signal (ΔP) is superimposed with the active power set point signal and the reactive power damping signal (ΔQ) with the reactive power set point signal in each case to form a total signal and are provided to a FACTS control system of at least one wind power installation.

According to one configuration, it is proposed that the active power damping signal and/or the reactive power damping signal are specified in such a way, and correspondingly the active power component or reactive power component are fed in such a way, that an operating point of the electrical supply grid shifts in such a way that at least one of the detected low-frequency electrical oscillations is reduced or prevented. The underlying idea here is particularly that the electrical supply grid can be dynamic and its oscillation property or the tendency to oscillate can depend here on the current operating point. Shifting the operating point can thus influence the oscillation property or the tendency to oscillate.

It is preferably proposed that determining an oscillation characteristic is carried out by means of an FFT analysis. It is also additionally or alternatively proposed that determining an oscillation characteristic is carried out by means of a wavelet analysis. Furthermore, it is additionally or alternatively proposed that determining an oscillation characteristic is carried out by means of a gradient analysis.

According to one embodiment, it is proposed that
the active power damping signal is specified as a modulated signal, while the reactive power damping signal is specified as a constant signal, or that
the reactive power damping signal is specified as a modulated signal, while the active power damping signal is specified as a constant signal.

In particular, this enables two independent control interventions in which the active power damping signal and the reactive power damping signal are specified completely different from one another, that is to say even according to mode. In this case, a modulated signal is particularly intended to be understood to mean a signal which is frequency modulated, for example with a frequency of 1 Hz.

The signal thus oscillates and this oscillation is reached by way of a modulation. This makes it possible to counteract a low-frequency oscillation in a targeted manner, for example, if the same frequency which has the low-frequency oscillation is modulated onto the modulated signal. In the case of the modulation, it is then also important to pay attention to this phase position, so that the low-frequency oscillation is damped and not yet excited.

However, a non-sinusoidal or not ideally sinusoidal signal form is also possible for the modulated signal. The other damping signal is not modulated and in principle has only one constant value, i.e., a constant active power value or a constant reactive power value.

According to one configuration, it is proposed that
for detecting at least one low-frequency electrical oscillation of the electrical supply grid, and/or
for determining in each case an oscillation characteristic of the at least one detected oscillation, the following steps are provided:
detecting at least one electrical signal of the electrical supply grid and
evaluating the electrical signal by means of a wavelet analysis in which a time-dependent frequency picture is created via a correlation analysis of the detected signal with a predetermined wavelet mother function,
wherein preferably the presence of a low-frequency oscillation is assumed if
at least one further low-frequency frequency component is present in the time-dependent frequency picture in addition to a basic component.

The method firstly then comprises the step of detecting at least one electrical signal of the electrical supply grid. In particular, a voltage measurement is proposed here, for example at the network connection point at which a wind power installation or a wind farm feeds into the electrical supply grid. A three-phase measurement is preferably carried out here if the electrical supply grid—which is usually to be assumed—is a three-phase electrical supply grid.

The electrical signal is then evaluated by means of a wavelet analysis. A wavelet analysis is known in principle and, in this respect, reference is made to appropriate specialist literature or specialized knowledge of the person skilled in the art for this purpose. However, it is now proposed here to use this wavelet analysis for evaluating the electrical signal, in order to identify low-frequency oscillations.

In the proposed wavelet analysis, a time-dependent frequency picture is created. This takes place via a correlation analysis of the detected signal with a predetermined wavelet mother function. This wavelet mother function is therefore predetermined and can therefore be specified. In this case, it can be fixedly specified and stored, for example, or changes to the wavelet mother function are also possible. It is also possible to carry out a plurality of analyses in each case, wherein the analyses use different wavelet mother functions in each case.

In any case, the correlation analysis of the detected signal with the predetermined wavelet mother function results in a time-dependent frequency picture. In the time-dependent frequency picture, frequencies are thus plotted over time. For example, a diagram can be used for visualization which uses the abscissa as a time axis and plots frequency values as an ordinate. However, the values are not plotted as individual values, but rather as a density of their occurrence, in that for example it is possible to assign a percentage energy via a color code.

In particular, this is a graphic display type but the information on which a graphic representation of this type is based can also be further evaluated in a process computer as values or value set, even without being visualized.

It is now preferably proposed that the presence of a low-frequency oscillation is assumed if at least one further low-frequency frequency component is present in the time-dependent frequency picture in addition to a basic component. In this respect, it should be repeated that the time-dependent frequency picture can indeed be represented graphically but does not have to be represented graphically for further evaluation. A time-dependent frequency picture here means in particular that different frequencies of different intensity, i.e., different amplitude, can also arise at different points in time. Thus, there is therefore no individual number and also no individual time-dependent scalar function, but rather time-dependent information, that is to say a lot of frequency information at any given time. This is referred to as a time-dependent frequency picture here.

The basic component is usually the nominal line frequency here, wherein, however, the actual line frequency can deviate from the nominal line frequency, wherein only a small deviation is likely to be expected, which can also be reflected in the time-dependent frequency picture accordingly if the accuracy for the deviation from the nominal line frequency is sufficient. However, this basic component is not important, other than the fact that it can be easily identified and is not to be interpreted as a detected low-frequency oscillation. This basic component can therefore be ignored or deducted in a further evaluation and only that which is remaining in addition to this basic component is examined, in order to identify the low-frequency oscillations.

If, for example, a frequency thus often occurs in the range of 4 to 6 Hz in this time-dependent frequency picture and with sufficient intensity, a low-frequency oscillation in the range of 4 to 6 Hz can thus be considered as identified. For example, a threshold value can be taken as a basis for the intensity. Additionally or alternatively, a minimum amount of time spread over time can be taken as a basis in order to assume an identified low-frequency oscillation. If, for example, in an observed period, a low-frequency oscillation has thus only occurred in a 10% range of the entire period, this can be considered as not being sufficient for identifying a low-frequency oscillation, for example. In contrast, if it occurs to a greater extent, for example more than 50% in the time range, this could be considered as an identification of a low-frequency oscillation, but possibly only if the intensity is sufficiently high. This should only be considered for illustrative purposes and different criteria, such as different thresholds, for example, can, in principle, be taken as a basis.

Based on an oscillation characteristic determined in this way, a corresponding active and/or reactive power for damping can be specified in a targeted manner. In particular, the active and/or reactive power feed-in can in each case be specified independent of one another for different properties of the oscillation characteristic. For example, depending on the oscillation form, i.e., whether the oscillation is sinusoidal, triangular, square wave or otherwise distorted, an active power can be modulated. At the same time, depending on the frequency of the oscillation, for example, an operating point of the electrical supply grid can be identified and can be shifted by way of a stationary change in the reactive power feed-in. The proposed wavelet analysis is particularly readily suitable for identifying these properties mentioned by way of example or other properties of the oscillation characteristic and, as a result, for enabling targeted active and/or reactive power feed-ins.

According to a further configuration, it is proposed that a temporal course of an amplitude of the at least one further frequency component is detected. This information can also be advantageously collected from the time-dependent frequency picture. Detecting this course of the amplitude of the further frequency component makes it possible in particular to identify the change in the frequency component. In particular, whether the amplitude is increasing or decreasing can be identified. A critical situation can be concluded particularly if the amplitude is increasing, i.e., increasing with time, which should trigger an intervention if applicable. Depending on a temporally increasing amplitude of a further frequency component, damping measures should then be carried out, in particular a damping electrical signal should be fed into the electrical supply grid.

However, it is also possible that the amplitude changes without showing a clear tendency toward decreasing or increasing. Conclusions regarding the situation in the electrical supply grid can optionally be drawn from the nature of the change of the amplitude.

A basis for a feed-in signal counteracting a frequency component of this type in a targeted manner can in particular be established by recording the temporal course.

According to one embodiment, it is proposed that a wavelet mother function is used which has at least one property from the following list:
1. The wavelet mother function is prepared to be scalable.
    The wavelet mother function can in particular be described as a time signal, i.e., as a function which is variable over time, such as, for example:

$$f(t) = \cos(k \cdot t) \cdot \frac{1}{(k \cdot t)^2 + 1}$$

In this formula, the function f(t) should form the wavelet mother function and this function would be scalable, in particular also scalable according to time. This can be achieved by the factor k being selected accordingly in this exemplary wavelet mother function. For example, this wavelet mother function with the factor k=1 can be referred to as a basic function or as an unscaled function and the scaling can be carried out by changing the factor k. If, for example, k=2 is selected as the factor, this would result in a compression of this wavelet mother function.

However, even considering the same wavelet mother function in the frequency range results in the function being able to be scaled according to the frequency by changing the factor k, i.e., it can be compressed or stretched according to the frequency.

Thus, the wavelet mother function is therefore prepared to be scalable. The factor k shown in the example is provided for this purpose, via which scaling is achieved.

This scalability according to time or frequency makes it possible to detect different frequencies. In example, or among other things, the selection of the test frequency range can be implemented accordingly.

2. The wavelet mother function is prepared to be temporally shiftable.
    This can mean, for example, that in the illustrative exemplary wavelet mother function shown above, a time with an offset is used instead of the time t. In the formula, "t" can therefore be replaced with "t+t₀", for example. This then results in a shift by the time to, wherein this time to can also be negative. Such a shift in the wavelet mother function can, if applicable, facilitate receiving information regarding when the respective frequency, i.e., the low-frequency oscillation to be identified, occurs. A wavelet analysis is preferably carried out multiple times with the same wavelet mother function, wherein, however, the only difference is that a temporally shifted wavelet mother function is used in each case. As a result, a plurality of time-dependent frequency pictures can then be created and, if applicable, dominant low-frequency oscillations, i.e., dominant low frequencies, can then occur at different points therein but also with different characteristic, depending on how the wavelet mother function being used was temporally related to the analyzed signal. To express it somewhat graphically, this low-frequency oscillation or this low frequency can occur to varying degrees in the time-dependent frequency picture, depending on the extent to which it occurred in the center of the wavelet mother function.

3. The wavelet function has locality both in the frequency range and in the time range. Locality is intended to be understood to mean here that the wavelet mother function is not evenly distributed, i.e., it is not evenly distributed in the time range nor is it evenly distributed in the frequency range. For example, a sine function is evenly distributed in the time range and therefore does not have a locality in the time range, since it oscillates evenly with the same amplitude over the entire range being taken into consideration. A Dirac pulse has a (strong) locality in the time range but is—at least theoretically—without locality in the frequency range, since it corresponds to white noise in the frequency range.

However, it is proposed here that locality is present both in the frequency range and in the time range. This property fulfills the abovementioned exemplary function, for example. It has, in fact, the greatest value for t=0, which is not reached at any other point. It therefore has its locality in the range t=0. It also exists outside of this range but fades with increasing time or also in a negative direction with an increasing time interval.

In the frequency range, this exemplary wavelet mother function also has locality, because it of course has its main characteristic in the frequency of the cos function used there. As a precaution, it is highlighted that the abovementioned illustrative exemplary wavelet mother function is of course not specified precisely, since the cos function is dependent on time there, and it would therefore have to be standardized to a time or basic frequency in the actual implementation. If it were to be standardized or correspond to 1 Hz as a basic frequency, for example, its greatest value would correspondingly be at 1 Hz in the frequency range.

This locality in particular also makes it possible that during the wavelet analysis of the detected electrical signal, the temporal inhomogeneity thereof is detected. In other words, this makes it possible to detect particularly effectively when a low-frequency oscillation or the correspondingly low frequency occurs.

4. The wavelet mother function preferably has an integral which is zero. This means that if an integral is formed over the entire wavelet mother function being used, the result is zero. This ensures that, in particular despite locality of the wavelet mother function, it is balanced in the positive and negative range in the time range, i.e., graphically speaking, it is formed above and below the time axis. In particular, this can also be advantageous when used in the frequency range or when transforming from the time range into the frequency range, since a direct component is effectively avoided.

5. A Morlet wavelet, a Daubechies D20 wavelet or a Mexican hat is used as a wavelet mother function. These wavelet functions are known in principle to the person skilled in the art but it has been recognized here that they are particularly effectively useful for identifying the low-frequency oscillations. Moreover, the Mexican hat can be defined by the abovementioned illustrative exemplary mother wavelet function.

It is preferably proposed that the active power damping signal ($\Delta P$) is specified for damping interarea oscillations or control mode oscillations. Additionally or alternatively, it is proposed that the reactive power damping signal ($\Delta Q$) is specified for damping intraplant oscillations, local plant oscillations, interarea oscillations or control mode oscillations.

It has been recognized that only certain oscillation modes of the low-frequency oscillations can be influenced with the active power and it is thus necessary to take into account the oscillation mode in order to be able to damp the low-frequency oscillations in a targeted manner. The following table 1 shows here how the corresponding oscillation modes can be influenced with an active power feed-in (P) or reactive power feed-in (Q).

TABLE 1

| Oscillation mode | Active power P | Reactive power Q |
| --- | --- | --- |
| Intraplant oscillations | no | yes |
| Control mode oscillations | yes | yes |
| Interarea oscillations | yes | yes |
| Local plant oscillations | no | yes |
| Torsional modes between rotating installations | — | — |

It is preferably proposed that the active power component or the reactive power component, in accordance with the oscillation mode, for a specified period of time, is fed at an increased rate, is fed at a reduced rate, is fed at an increased or reduced rate in a pulsed manner, is fed at an increased and reduced rate alternately in an alternating pulse sequence and additionally or alternatively is fed in a ramp-shaped manner rising or falling.

In this case, an increased or reduced active power component/reactive power component relates to an active power component or reactive power component which is present at the operating point at which no low-frequency oscillation has been detected in the electrical supply grid. If, for example, a wind power installation is operated at a point in time ti with an active power component of 100% (full load) without a reactive power component, a control of the wind farm can take place for a specified period of time in such a way that the wind power installations are reduced to 80% active power and a capacitive reactive power component is fed into the electrical supply grid if a low-frequency oscillation has been detected. This variant corresponds to the reduction of the active power component and an increase in the reactive power component.

It has been recognized that the electrical supply grid can be shifted into a different operating point with changed load flows by means of the changed feed-in or that the operating point of the electrical supply grid can be shifted. A different operating point here describes a changed load flow state in the electrical grid which results in the low-frequency oscillation being damped. In addition, it has been recognized that the wind farm does not have to permanently feed a changed power (P or Q), but rather the supply grid can be permanently shifted into a different system state by way of a temporarily changed power feed-in. In this case, it is in particular proposed that the predetermined period of time with which a changed power feed-in takes place is to be interpreted as being longer than a half wave of the low-frequency oscillation. The specified period of time is therefore in a range from a few milliseconds to several seconds, for example from 0.3 to 30 seconds.

In this case, particularly preferable is the variant that the active power component is fed at a reduced rate for a specified period of time. The underlying knowledge here is that by reducing the active power, the power flow into the electrical supply grid is reduced, that is to say at least by the proportion which the wind farm is no longer feeding, and the undesired low-frequency oscillations are thus to a lesser extent energetically excited.

It is preferably proposed that the oscillation characteristic comprises at least one additional property from the list, namely a phase position ($\varphi_{Grid}$) of the oscillation signal, an oscillation amplitude of the oscillation signal or a characteristic frequency spectrum of the oscillation signal.

The phase position of the oscillation signal describes in particular how the oscillation signal or the low-frequency oscillation lies in its phase angle in relation to a reference signal. This can be the phase position of the oscillation in relation to a specified reference signal, for example, which can also be an arbitrary signal. The absolute phase position is therefore particularly relevant, which is to be taken into account, if applicable, when feeding a correspondingly modulated damping signal.

The oscillation amplitude of the oscillation signal describes the maximum displacement relative to the position of the arithmetic average of the oscillation signal. The frequency spectrum in particular relates to a spectrum which has been determined by applying a Fourier transform. However, said properties of an oscillation are known in principle and, in this respect, reference is made to appropriate specialist literature or specialized knowledge of the person skilled in the art. It is in particular proposed here to use these properties for characterizing the oscillation, in order to control the damping on this basis.

The location at which the oscillation signal has been detected can be present in the form of GPS coordinates, for example. This makes it possible to evaluate a spatial movement of a low-frequency oscillation in the electrical supply grid or a subgrid section.

It is preferably proposed that the network characteristic of the electrical supply grid is or comprises at least one network sensitivity which describes a change in the voltage at the network connection point relating to a change in the power fed at the network connection point. The network sensitivity is important information for the intended control of the wind farm for feeding electrical power into the grid. This network sensitivity is a property which relates in particular to the network connection point. It is dependent on network properties such as the network topology but also on current network states. In principle, it specifies how sensitively the voltage at the network connection point reacts to influences, and it therefore specifies how sensitive the electrical supply grid is there. If the generator is a wind power installation or a wind farm with a plurality of wind power installations, the fluctuating wind velocity is an external variable which can have an influence on the grid and thus on the voltage at the connection point via the wind power installation. Fluctuations in wind velocity can therefore also have a strong or weak influence on the voltage at the connection point and accordingly there can therefore also be a high or low network sensitivity with respect to fluctuations in wind velocity.

Additionally or alternatively, it is proposed that the network characteristic of the electrical supply grid is or comprises a network topology which describes the constructive structure of the grid and/or describes a type, a number and a point of connection of connected consumers and generators in the grid. The network topology can therefore also describe or include the size and distance of existing synchronous machines, the oscillating weight of which can also be particularly relevant, or a converter component in the electrical supply grid. A constructive structure and a spatial extension of the electrical supply grid can also be taken into account. In this case, one type of generators can be a distinction between small generators or large generators. Furthermore, a distance to a network core area, such as a city, can also be assigned to the network topology.

Additionally or alternatively, it is proposed that the network characteristic of the electrical supply grid is or comprises at least one line impedance, in particular at the network connection point. Further impedances, which are taken into account in one particular embodiment of the network characteristic, are an impedance between directly coupled synchronous generators, which can have a strong influence in particular as a result of their oscillating weights, in the supply grid, as well as an impedance between the wind power installations and a network core area, such as a municipal area.

Additionally or alternatively, it is proposed that the network characteristic of the electrical supply grid is or comprises a line frequency ($f_{Grid}$) of a line voltage. This is usually 50 Hz or 60 Hz.

Additionally or alternatively, it is proposed that the network characteristic of the electrical supply grid is or comprises at least one short circuit current ratio, in particular at the network connection point. In this case, the short circuit current ratio relates to the ratio of the short circuit power of the supply grid of the connection point relative to the connection power of the wind farm, in particular the sum of the nominal powers of all wind power installations of the wind farm being observed. In one particular embodiment, a grid operator provides information regarding the properties described previously of the electrical supply grid.

It is preferably proposed that at least one network characteristic is determined by means of an analysis method from the list including a network sensitivity analysis for determining the network sensitivity, a network topology analysis for determining the network topology, and a line frequency analysis for determining the characteristic frequency and the characteristic frequency spectrum. The listed analysis methods are in this case carried out for determining the network characteristic or for determining the network properties and can in this case be determined in advance of commencing operation of the wind farm or during operation of the wind farm. They are carried out in particular if the properties of the electrical supply grid are unknown.

It is preferably proposed that the network sensitivity analysis comprises the steps:
changing the fed active power and additionally or alternatively the fed reactive power, and
determining a frequency response or amplitude response of the voltage at the network connection point to the change in the fed active power and additionally or alternatively the reactive power.

In one particular embodiment, it is proposed that the frequency response or amplitude response is determined by calculating a partial derivative of the line voltage according to the active power and/or a partial derivative of the voltage according to the reactive power. The rate of change of the frequency and of the amplitude of the line voltage is therefore determined, in each case for the active power or the reactive power change. In this case, the frequency change of the line voltage to a changed active power feed-in as well as the amplitude change of the line voltage to a changed reactive power is in particular determined.

It is preferably proposed that a or the network topology analysis comprises at least the step of establishing a structure and an extension of the electrical grid based on network diagrams or distance measurements. In this case, a network diagram can be sourced from a grid operator.

Additionally or alternatively, a or the network topology analysis can comprise the step of establishing a line impedance between two points in the electrical supply grid. In one particular embodiment, it is proposed that the line impedance between a wind power installation and a network core area is detected, wherein the network core area preferably describes a network connection point or network area to which at least one power station with at least one synchronous generator directly coupled with the electrical supply grid is connected.

Additionally or alternatively, a or the network topology analysis can comprise the step of establishing a short circuit current ratio based on specifications of a grid operator or by calculation.

Furthermore, a wind farm or wind power installation is proposed. A wind farm of this type or a wind power installation of this type comprises at least one measuring device for detecting at least one low-frequency electrical oscillation in the electrical supply grid, an identification device for determining in each case an oscillation characteristic of the at least one detected oscillation, a control device for specifying an active power damping signal (ΔP) and/or a reactive power damping signal (ΔQ), and a feed-in device for feeding an active power component in accordance with the active power damping signal or a reactive power component in accordance with the reactive power damping signal.

The wind farm or the wind power installation is therefore set up to feed active and reactive power by means of the feed-in device into an electrical supply grid with a line voltage, wherein the line voltage has a nominal line frequency. In this case, the nominal line frequency is usually 50 Hz or 60 Hz. The low-frequency electrical oscillation which is detected by means of the measuring unit in this case has a frequency, wherein the frequency can be less than half the nominal line frequency, for example. According to this example, it is therefore proposed that a low-frequency oscillation is detected in a frequency range below 25 Hz or 30 Hz, preferably in a frequency range of 5-15 Hz, in particular in a frequency range of 0.2-3 Hz. The measuring device can be formed as a voltmeter for this purpose and measure at least one line voltage of the electrical supply grid.

In addition to the measuring device, the wind farm or the wind power installation comprises an identification device for determining in each case an oscillation characteristic of the at least one detected oscillation, wherein the oscillation characteristic describes at least one property of the detected oscillation. In this case, the identification device can be provided as a process computer or can be implemented on a process computer of this type. It is therefore proposed to realize the identification device as hardware or as part of a computer program. In particular, the identification device is prepared to receive and to process measurement data of the measuring device (sensor, multimeter, voltmeter or ammeter) or the information about the oscillation detected by the measuring device. The identification device can therefore evaluate the measurement of the measuring device or the detected line voltage, and characterize the low-frequency oscillation via properties, such as a phase position of the oscillation signal, an oscillation amplitude of the oscillation signal, a characteristic frequency spectrum of the low-frequency oscillations, or a location at which the oscillation signal has been detected.

A control device (controller) for specifying an active power damping signal ΔP and additionally or alternatively a reactive power damping signal ΔQ is proposed as a further component of the wind farm or the wind power installation. In this case, the control device can also be part of the identification device. In particular, the control device is prepared to produce the active power damping signal ΔP and the reactive power damping signal ΔQ depending on the determined oscillation characteristic and provide them to the feed-in unit. The control device can also here be provided on a process computer or implemented as part of a computer program.

In addition, the wind farm or the wind power installation also comprises a feed-in device for feeding an active power component in accordance with the active power damping signal or a reactive power component in accordance with the reactive power damping signal, wherein specifying the active power damping signal (ΔP) or the reactive power damping signal (ΔQ) takes place depending on the determined oscillation characteristic. In this case, the feed-in unit is preferably a controllable converter or inverter.

According to one embodiment, it is proposed that the wind farm or the wind power installation is set up to perform a method according to one of the embodiments described previously, in particular by means of the measuring device, the identification device, the control device and the feed-in device.

To summarize, the fact that both the active and the reactive power of a modern wind power installation can be modulated very fast is therefore utilized. In this case, the idea is to carry out a feed-in into the grid by means of wind power installations or the wind farm, in order to damp low-frequency oscillations. In particular, it is advantageous to carry out a reactive power feed-in, since they only have a very small influence on the yield of a wind power installation. However, not all types of low-frequency oscillations or oscillation signals can be damped by reactive power signals, as shown in the above table 1. It is therefore proposed in particular to use an appropriate allocation of active and reactive power, in order to, on the one hand, minimize possible yield losses and, on the other hand, to obtain an optimal damping result. In this case, the low-frequency oscillation is identified in a first step, in order to then carry out the feed-in in a manner adapted to this.

BRIEF DESCRIPTION OF THE SEVERAL VIEWS OF THE DRAWINGS

The invention is explained hereinafter by way of example using embodiments with reference to the accompanying figures.

DETAILED DESCRIPTION

Figure 1:
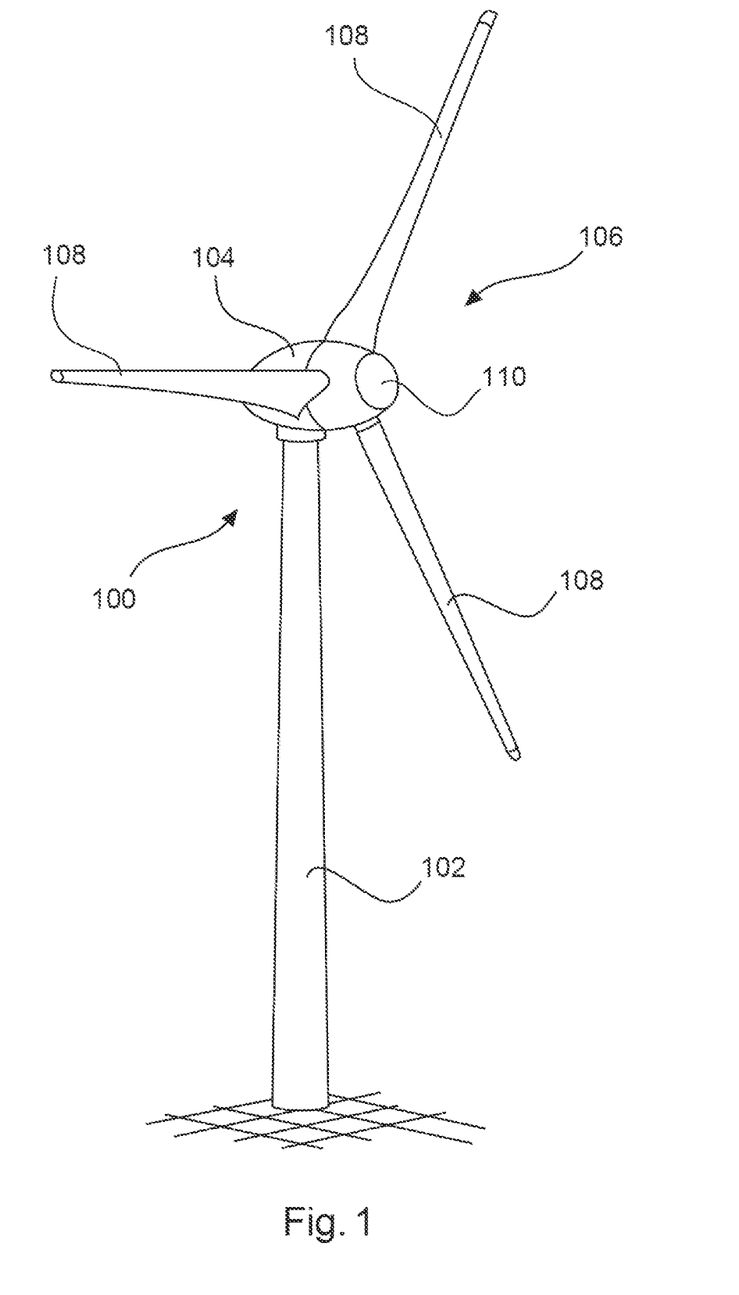
FIG. 1 schematically shows a wind power installation.

FIG. 1 shows a wind power installation 100 with a tower 102 and a nacelle 104. A rotor 106 with three rotor blades 108 and a spinner 110 is arranged on the nacelle 104. The rotor 106 is transferred into a rotational movement by the wind during operation and thus drives a generator in the nacelle 104.

Figure 2:
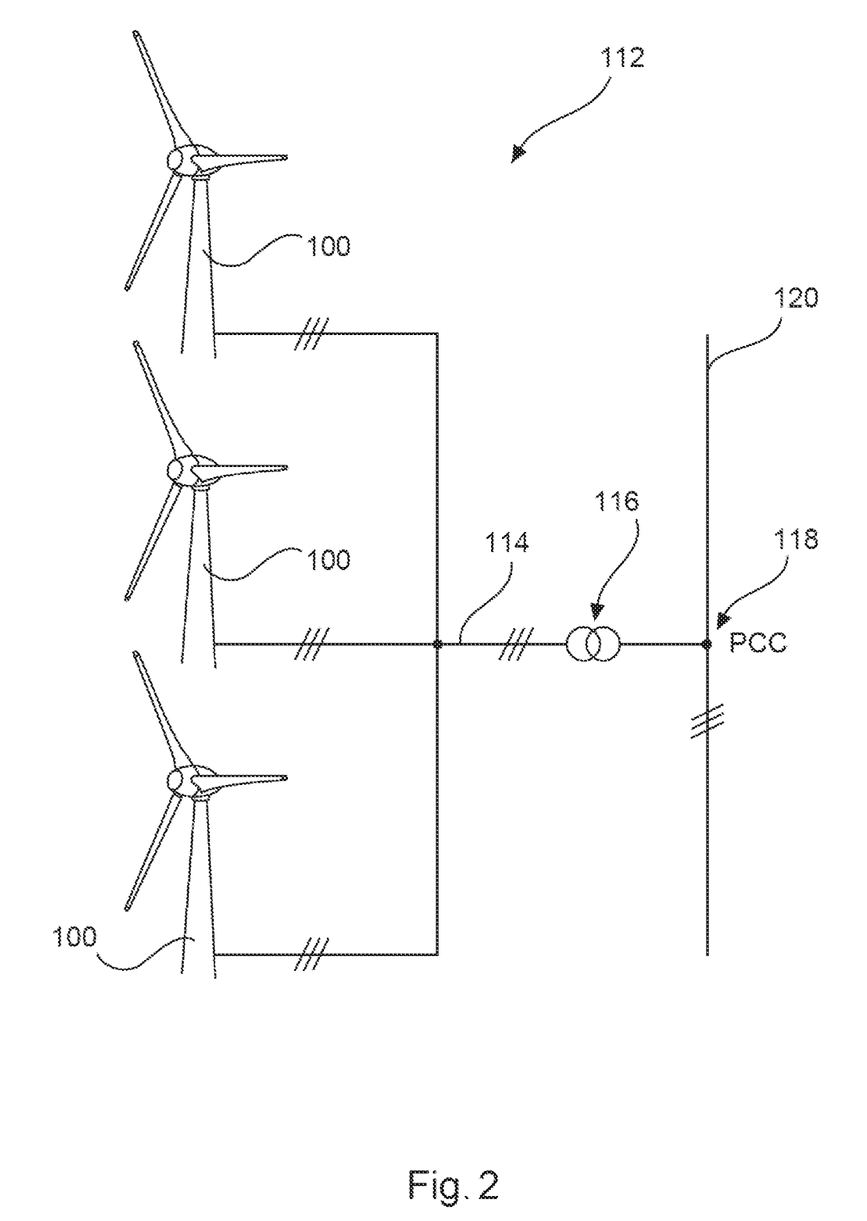
FIG. 2 schematically shows a wind farm.

FIG. 2 shows a wind farm 112 with three wind power installations 100 by way of example, which can be identical or different. The three wind power installations 100 are therefore representative of essentially any number of wind power installations of a wind farm 112. The wind power installations 100 provide their power, that is to say in particular the electricity produced via an electrical farm network 114. In this case, the currents or powers produced in each case from the individual wind power installations 100 are added up and a transformer 116 is usually provided which boosts the voltage in the farm, in order to then feed it into the supply grid 120 at the feed-in point 118, which is also commonly referred to as PCC. FIG. 2 is merely a simplified representation of a wind farm 112 which does not show any control system, for example, even though a control system is of course present. The farm network 114 can also be configured differently, for example, by a transformer also being present at the output of each wind power installation 100, for example, to mention only one other exemplary embodiment.

Figure 3:
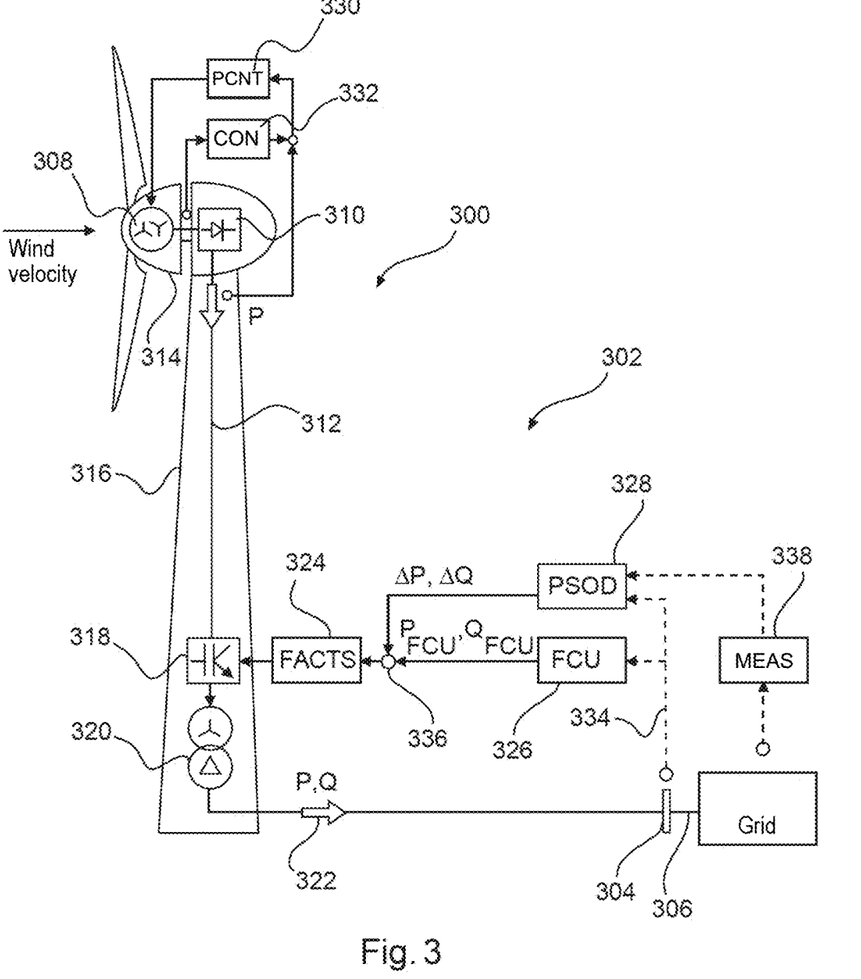
FIG. 3 schematically shows a controller structure for controlling the wind farm.

FIG. 3 shows a controller structure 302 for controlling the wind farm for damping the low-frequency oscillations. FIG. 3 only shows one wind power installation 300 for illustrative purposes which can be one of a plurality of wind power installations of a wind farm, as shown in FIG. 2, for example. The wind power installation 300 is connected to an electrical supply grid 306 via a network connection point 304. The electrical supply grid 306 is also referred to in a simplified manner hereinafter as grid or network, wherein these terms are to be regarded as synonyms.

The wind power installation 300 has a generator 308 which is operated by the wind and produces electrical power as a result. In one embodiment, the generator 308 is formed as an electrically excited multi-phase synchronous generator with two 3-phase systems each connected in a star shape, which is illustrated by the two star symbols in the generator 308 in FIG. 3. The alternating current produced in this way, that is to say the 6-phase alternating current in the above example, is rectified with a rectifier 310 and is transmitted as a direct current via a corresponding direct current line 312, which can comprise a plurality of individual lines, from the nacelle 314, down the tower 316, to an inverter 318.

The inverter 318 produces an alternating current from the direct current, namely a 3-phase alternating current in the example shown, for feeding into the grid 306. For this purpose, the alternating voltage produced by the inverter 318 is boosted by means of a transformer 320, in order to then be fed into the grid 306 at the network connection point 304. The transformer 320 shown uses a star-delta connection, that is to say a star connection on the primary side and a delta connection on the secondary side, which is merely represented here as an example of an embodiment.

In addition to the feed-in of active power P, the feed-in into the grid 306 can also include the feed-in of reactive power Q, which is illustrated by the active arrow 322. The inverter 318 is controlled by a corresponding control unit (controller) 324 for the specific feed-in, wherein the control unit 324 can also be structurally combined with the inverter 318. This control system 324 is provided as a FACTS control system. In this case, the abbreviation FACTS stands for the term "Flexible AC Transmission System," which is also used among German speaking experts. In particular, a FACTS control system of this type is prepared to feed current with specifiable frequency and phase into the electrical supply grid 306 or to extract it therefrom. A 4-quadrant operation is in particular therefore possible which can feed and/or extract active and reactive power.

In particular, FIG. 3 is intended to illustrate the basic active structure and the specific arrangement of individual elements can also be selected differently than represented. For example, the transformer 320 can be provided outside of the tower 316.

The control unit 324 controls the inverter 318 in particular in such a way that the manner of the feed-in into the grid 306 is controlled. This includes tasks such as adapting the current to be fed to the situation in the grid 306, in particular the frequency, phase and amplitude of the voltage in the grid 306. The control unit 324 is also provided to control the proportion of active power P and reactive power Q of the power which is currently being fed into the grid 306.

Measurements are carried out in the grid 304 here, in particular at the network connection point 304 and evaluated accordingly. Alternatively, a measurement can also be carried out at the output terminals of the inverter 318, which is not represented in FIG. 3.

In contrast to a voltage control system already known, the voltage is measured in the grid or at the network connection point 304 or at the connection terminals of the wind power installation and subsequently provided to a wind farm controller 326 and a detection unit (detection controller or processor) 328, which is indicated with the dotted arrow 334. In this case, the abbreviation FCU in the block 326 stands for the term "Farm Control Unit" and therefore describes a wind farm controller, also in the language use of German persons skilled in the art. The abbreviation PSOD in the block 328 stands for the term "Power System Oscillation Damping," i.e., damping oscillations in a power system, and therefore describes a damping of low-frequency oscillations, also in the language use of German persons skilled in the art.

In comparison to the wind farm controller 326, the detection unit (detection controller or processor) 328 is provided and set up here for detecting at least one low-frequency electrical oscillation of the electrical supply grid, in particular by evaluating the detected line voltage. For this purpose, the detection unit 328 can have a low-pass filter and an evaluation unit, in order to filter the characteristic frequency range of low-frequency oscillations and to perform an analysis of the line voltage. In this case, the detection unit can perform analysis methods such as an FFT analysis, a wavelet analysis or a gradient analysis, for example.

The result of the analysis or the evaluation is the oscillation characteristic which describes at least one property of a detected oscillation. The detection unit therefore determines an oscillation characteristic for each low-frequency oscillation. In one specific example, the detection unit creates an oscillation characteristic in the form of a parameter vector or parameter set in which the properties of the detected low-frequency oscillation are stored as entries, such as the oscillation mode and the frequency of the detected low-frequency oscillation, for example. If a plurality of low-frequency oscillations occur, a plurality of oscillation characteristics can be determined, i.e., two parameter sets are created for each oscillation, for example.

The detection unit 328 therefore detects one or a plurality of low-frequency electrical oscillations in the electrical supply grid and determines in each case an oscillation characteristic of the at least one detected oscillation, wherein the oscillation characteristic describes at least one property of the detected oscillation.

Once the detection unit 328 has thus detected one or a plurality of low-frequency electrical oscillations in the electrical supply grid and has characterized them via the oscillation characteristic, an active power damping signal ΔP and a reactive power damping signal ΔQ are specified, based on the result of the evaluation or characterization of the low-frequency oscillation. It is therefore proposed to not only consider a simple threshold value, but rather to firstly characterize the low-frequency oscillation by way of an analysis. Characterizing the low-frequency oscillation takes place in particular in order to improve specific information regarding the oscillation, such as a frequency value, in order to also be able to concomitantly consider causes for the oscillation.

According to the embodiment shown, specifying the two damping signals ΔP and ΔQ takes place here in parallel and thus independent of a specification of the power set points $P_{FCU}$ and $Q_{FCU}$ which are produced by the wind farm controller 326. The damping signals ΔP and ΔQ produced in parallel as well as the power set points $P_{FCU}$ and $Q_{FCU}$ of the wind farm controller are then provided to the control system 324. For this purpose, the signals ΔP, ΔQ, $P_{FCU}$ and $Q_{FCU}$ are added to two total set point signals at a node 336, one for active power and one for reactive power in each case. The control system 324 then controls the inverter 318 depending on the two total set point signals and thus closes the control circuit for power control.

FIG. 3 also shows an element for specifying the active power damping signal (ΔP) or the reactive power damping signal (ΔQ) additionally depending on a determined network characteristic. For this purpose, the structure or the property of the electrical supply grid 306, such as the network sensitivity, the short circuit current ratio or the network topology are detected by a network measuring unit (sensor, multimeter, voltmeter or ammeter) 338 or these properties are stored in the network measuring unit 338 if they are known. The network characteristic is then, in addition to the oscillation characteristic, taken into account by the detection unit 328 when specifying the active power damping signal ΔP or the reactive power damping signal ΔQ. In this case, the network measuring unit 338 can also be a part of the detection unit 328. The network measuring unit can be set up, for example, to feed a power into the electrical supply grid and to detect the response of the grid, particularly the line voltage, and to derive a property of the grid therefrom, such as the network sensitivity, for example.

Finally, FIG. 3 additionally illustrates the control system of the generator of the wind power installation. A power control block (power controller) 330 and a power evaluation block (controller) 332 are provided in the area of the nacelle for controlling the generator. In the example of the embodiment shown, the power control block 330 in particular controls the excitation, that is to say the excitation current, of the externally excited synchronous generator. The power evaluation block 332 evaluates the power supplied to the rectifier 310 and compares it to the power emitted by the rectifier 310 to the inverter 318 via the direct current lines 312. The result of this evaluation is further specified to the power control block 330.

Figure 4:
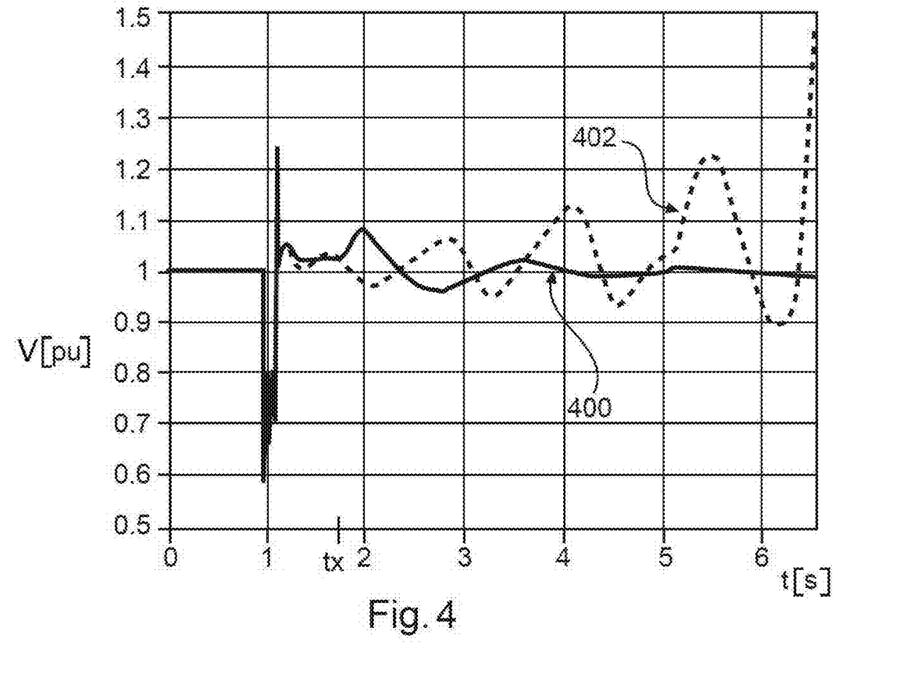
FIG. 4 schematically shows two voltage curves of a line voltage.

FIG. 4 schematically shows two voltage curves of a line voltage. In the diagram shown, the line voltage at the connection terminals of a wind power installation is plotted in per unit over time in seconds for this purpose. At the point in time t=1 s, the voltage curve occurs after a network error which results in a strong voltage drop of the line voltage to 0.6 pu of the line voltage. The line voltage then increases again strongly approximately at the point in time t=1.1. The result of this pulse-shaped excitation can be that the electrical supply grid, which is an oscillatory power system, can be excited to a low-frequency oscillation.

At the point in time tx, a low-frequency oscillation is detected by the detection unit 328 and is characterized as a control mode oscillation which has been excited by the pulse-shaped voltage jump, for example. After this point in time, an active and reactive power damping signal is now specified by the detection unit, so that the low-frequency oscillation is damped by the changed feed-in of the wind farm. The stable curve of the line voltage 400 is reached.

In comparison, the curve of the line voltage 402 shows the case in which no detection unit 328 is used and no damping signal is specified. The low-frequency oscillation enters into resonance and oscillates as a result of a missing damping-effecting active or reactive power feed-in.

Figure 5:
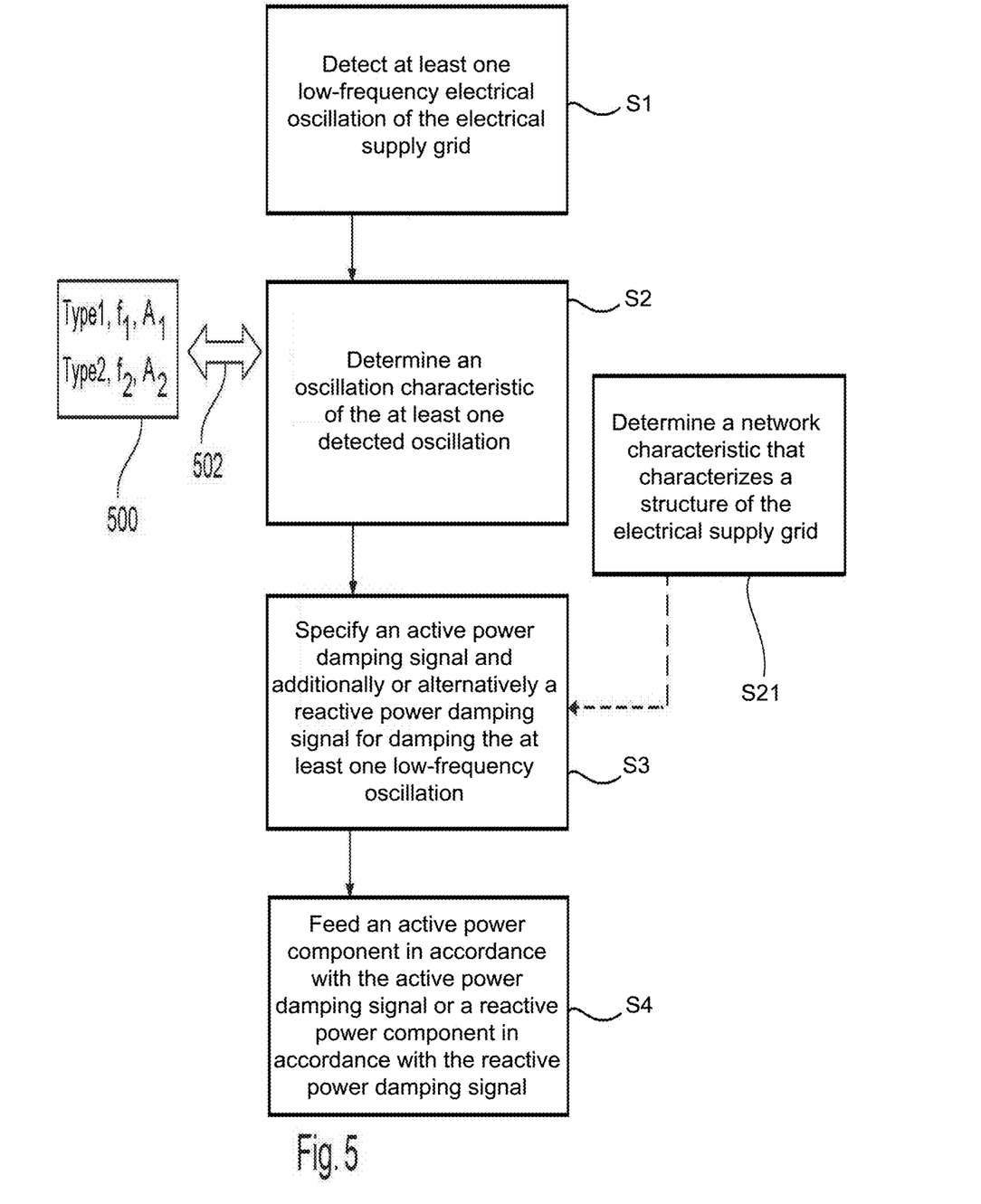
FIG. 5 schematically shows a flow diagram for controlling a wind farm.

FIG. 5 shows a flow diagram according to the method according to the disclosure. In a first step S1, at least one low-frequency electrical oscillation of the electrical supply grid is detected in this case. Step S1 can thus also be understood as a measurement step. In step S2, an oscillation characteristic of the at least one detected oscillation is then determined in each case, wherein the oscillation characteristic describes at least one property of the detected oscillation. Step S2 can therefore be regarded as a characterization step in which a first low-frequency oscillation is characterized via an oscillation mode Type1, a frequency $f_1$ and an oscillation amplitude $A_1$, and a second low-frequency oscillation via Type2, $f_2$, $A_2$, for example. In this case, it is indicated by the double arrow 502 that a comparison 502 with a lookup table 500 can take place, in order to assign results of an evaluation, which is performed in step S2, to an oscillation mode. In addition, set points for the active power damping signal ΔP or for the reactive power damping signal ΔQ can also be stored in the lookup table, which set points are selected in accordance with the characterized low-frequency oscillation.

In a further step S3, specifying an active power damping signal and additionally or alternatively specifying a reactive power damping signal takes place in each case for damping the at least one low-frequency oscillation characterized by the oscillation characteristic. In this case, specifying the active power damping signal ΔP or the reactive power damping signal ΔQ takes place depending on the determined oscillation characteristic. Then in one last step S4, an active power component is fed in accordance with the active power damping signal or a reactive power component is fed in accordance with the reactive power damping signal.

In this case, provision is optionally made for a further step S21 to take place in addition to step S2, namely determining a network characteristic which characterizes a structure of the electrical supply grid, wherein specifying the active power damping signal ΔP or the reactive power damping signal ΔQ additionally takes place depending on the determined network characteristic. This additional optional variant is represented in FIG. 5 with the dotted arrow. When feeding the active and reactive power for damping the low-frequency oscillations, the structure or the properties of the electrical grid is/are thus also taken into account by the network characteristic.

To summarize, it is therefore proposed to detect oscillations or low-frequency oscillations by way of an additional method and to generate damping signals ΔP and ΔQ depending on the oscillation properties and optionally network properties of the system or the electrical grid. In this case, the fact that a different influenceability of the oscillation modes is provided by P & Q is particularly utilized. In particular, the regulatory objective of implementing a method for damping so-called power systems oscillations at wind power or wind farm level by means of targeted active and reactive power feed-in (ΔP- and ΔQ-damping signals) is pursued.

In the proposed method, determining the oscillation signal therefore takes place, wherein in particular the frequency and phase position of the low-frequency oscillation signal are detected. In this case, an oscillation characteristic is determined. Suitable damping signals are then produced in accordance with the oscillation characteristic and additionally or alternatively in accordance with a network characteristic. In this case, the network characteristic can take place by means of a network sensitivity analysis which represents determining the response of a feed-in ΔP & ΔQ, or by means of analytical methods, such as a network topology or oscillation frequency analysis, for example. Based on this, a feed-in of the damping signals then occurs by way of the wind power installation.

In this case, the method according to the embodiments described previously enables a damping of low-frequency oscillations and more stable grid operation, without additional utilization of grid installations. In addition, an increase in the acceptance of converter-fed feed-in technology can be achieved by improving system safety and the risks of low-frequency oscillations in power transmission systems can be minimized by wind power stations.

The invention claimed is:

1. A method for controlling a wind farm for damping low-frequency electrical oscillations in an electrical supply grid having a line voltage with a nominal line frequency, wherein the wind farm includes at least one wind power installation connected to the electrical supply grid, the method comprising:
   detecting at least one low-frequency electrical oscillation of the electrical supply grid;
   determining an oscillation characteristic of the at least one low-frequency electrical oscillation, wherein the oscillation characteristic represents at least one property of the at least one low-frequency electrical oscillation;
   generating, based on the oscillation characteristic, an active power damping signal or a reactive power damping signal for damping the at least one low-frequency electrical oscillation having the oscillation characteristic; and
   feeding, into the electrical supply grid, an active power component in accordance with the active power damping signal or a reactive power component in accordance with the reactive power damping signal,
   wherein determining the oscillation characteristic includes determining an oscillation mode, wherein the oscillation mode is at least one of:
     intraplant oscillations between a plurality of production units including the wind farm that are connected to the electrical supply grid in a supply section;
     control mode oscillations caused by feedback control of the plurality of production units, a plurality of consumers or a plurality of transducers connected to the electrical supply grid;
     interarea oscillations between a plurality of supply sections of the electrical supply grid; or
     local plant oscillations between the wind farm and the electrical supply grid.

2. The method as claimed in claim 1, wherein:
   the electrical supply grid has an operating point characterized by load flows; and
   feeding the active power component or the reactive power component into the electrical supply grid is performed such that the load flows in the electrical supply grid are changed to change the operating point of the electrical supply grid.

3. The method as claimed in claim 1, comprising:
   determining a network characteristic that characterizes a structure of the electrical supply grid; and
   generating the active power damping signal or the reactive power damping signal depending on the network characteristic.

4. The method as claimed in claim 3, wherein the network characteristic of the electrical supply grid is at least one property from a list of properties including:
   a line frequency of the line voltage;
   a network sensitivity representing a change in a voltage at a network connection point relating to a change in a power fed;
   a network topology representing a constructive structure of the electrical supply grid or a type, a number and a point of connected consumers and generators in the electrical supply grid;
   a line impedance at the network connection point; and
   a short circuit current ratio at the network connection point.

5. The method as claimed in claim 3, wherein the network characteristic is determined using at least one of:
   a network sensitivity analysis for determining network sensitivity;
   a network topology analysis for determining network topology; or
   a line frequency analysis for determining a characteristic frequency and a characteristic frequency spectrum.

6. The method as claimed in claim 5, wherein the network sensitivity analysis includes:
   changing a fed active power or a fed reactive power; and
   determining a frequency response or amplitude response of a voltage at a network connection point to changing the fed active power or the fed reactive power by determining a partial derivative of the voltage according to the active power or a partial derivative of the voltage according to the reactive power.

7. The method as claimed in claim 5, wherein the network topology analysis includes:
   establishing the structure and an extension of the electrical supply grid based on network diagrams or distance measurements;

establishing a line impedance between the at least one wind power installation and a network core area, wherein the network core area represents a network connection point or a network area to which at least one power station is connected, wherein the at least one power station has at least one synchronous generator directly coupled with the electrical supply grid; and calculating a short circuit current ratio or determining the short circuit current ratio based on specifications of a grid operator.

8. The method as claimed in claim 1, wherein the active power damping signal and the reactive power damping signal are generated independently of each other.

9. The method as claimed in claim 8, comprising:
generating the active power damping signal by an active power damping function, wherein the active power damping function has, as an input, at least one first property of the oscillation characteristic;
generating the reactive power damping signal by a reactive power damping function, wherein the reactive power damping function has, as an input, at least one second property of the oscillation characteristic; or
generating the active power damping signal and the reactive power damping signal independently of an active power set point or reactive power set point of a wind farm controller.

10. The method as claimed in claim 8, comprising:
feeding the active power component or the reactive power component such that different low-frequency oscillation modes are damped independently of each other.

11. The method as claimed in claim 1, comprising:
determining the oscillation characteristic using FFT analysis, wavelet analysis or gradient analysis.

12. The method as claimed in claim 1, wherein:
the active power damping signal is generated for damping the interarea oscillations or the control mode oscillations; or
the reactive power damping signal is generated for damping the intraplant oscillations, the local plant oscillations, the interarea oscillations or the control mode oscillations.

13. The method as claimed in claim 1, comprising:
feeding the active power component or the reactive power component, in accordance with the oscillation characteristic, for a specified period of time at an increased rate, at a reduced rate, at the increased or reduced rate in a pulsed manner, at the increased and reduced rate alternately in an alternating pulse sequence or in a rising or falling ramp manner.

14. The method as claimed in claim 1, wherein the oscillation characteristic is at least one property from a list of properties including:
a phase position of the at least one low-frequency electrical oscillation;
an oscillation amplitude of the at least one low-frequency electrical oscillation;
a characteristic frequency spectrum of the at least one low-frequency electrical oscillation; and
a location at the at least one low-frequency electrical oscillation is detected.

15. The method as claimed in claim 1, comprising:
detecting at least one electrical signal of the electrical supply grid;
evaluating the at least one electrical signal using wavelet analysis in which a time-dependent frequency pattern is generated based on correlation analysis of the at least one electrical signal and a wavelet mother function;
determining that a low-frequency component and a basic component are present in the time-dependent frequency pattern; and
in response to determining that the low-frequency component and the basic component are present in the time-dependent frequency pattern, detecting the at least one low-frequency electrical oscillation of the electrical supply grid or determining the oscillation characteristic of the at least one low-frequency electrical oscillation.

16. The method as claimed in claim 15, comprising:
detecting a temporal course of an amplitude of the low-frequency component.

17. The method as claimed in claim 15, wherein the wavelet mother function has at least one property from a list of properties including:
the wavelet mother function is configured to be scalable in time or frequency;
the wavelet mother function is configured to be temporally shiftable;
the wavelet mother function has locality both in a frequency range and in a time range;
the wavelet mother function has an integral in the time range that is 0; and
the wavelet mother function is a Morlet wavelet, a Daubechies D20 wavelet or a Mexican hat wavelet.

18. The method as claimed in claim 1, wherein:
the active power damping signal is a modulated signal and the reactive power damping signal is a constant signal; or
the reactive power damping signal is a modulated signal and the active power damping signal is a constant signal.

19. The method as claimed in claim 1, wherein the at least one low-frequency electrical oscillation has a frequency between 1 Hz and five times the nominal line frequency.

20. The method as claimed in claim 1, wherein the low-frequency electrical oscillations are sub synchronous resonances.

21. A wind farm or wind power installation configured to feed active and reactive power into an electrical supply grid having a line voltage associated with a nominal line frequency, the wind farm or wind power installation comprising:
a sensor configured to detect at least one low-frequency electrical oscillation in the electrical supply grid;
a controller configured to:
determine an oscillation characteristic of the at least one low-frequency electrical oscillation, wherein the oscillation characteristic represents at least one property of the at least one low-frequency electrical oscillation; and
generate, based on the oscillation characteristic, an active power damping signal or a reactive power damping signal; and
an inverter configured to feed an active power component in accordance with the active power damping signal or a reactive power component in accordance with the reactive power damping signal,
wherein determining the oscillation characteristic includes determining an oscillation mode, wherein the oscillation mode is at least one of:
intraplant oscillations between a plurality of production units including the wind farm that are connected to the electrical supply grid in a supply section;

control mode oscillations caused by feedback control of the plurality of production units, a plurality of consumers or a plurality of transducers connected to the electrical supply grid;

interarea oscillations between a plurality of supply sections of the electrical supply grid; or local plant oscillations between the wind farm and the electrical supply grid.

* * * * *